(12) United States Patent
Deng

(10) Patent No.: US 10,796,809 B2
(45) Date of Patent: *Oct. 6, 2020

(54) SYSTEM FOR REMOVING FOREIGN OBJECTS FROM NUCLEAR REACTOR VESSEL

(71) Applicant: Sichuan Xingzhi Zhihui Intellectual Property Operation Co., Ltd., Chengdu, Sichuan (CN)

(72) Inventor: Liping Deng, Sichuan (CN)

(73) Assignee: Sichuan Xingzhi Zhihui Intellectual Property Operation Co., Ltd., Chengdu (CN)

( * ) Notice: Subject to any disclaimer, the term of this patent is extended or adjusted under 35 U.S.C. 154(b) by 562 days.

This patent is subject to a terminal disclaimer.

(21) Appl. No.: 15/847,962

(22) Filed: Dec. 20, 2017

(65) Prior Publication Data
US 2018/0358139 A1   Dec. 13, 2018

(30) Foreign Application Priority Data
Jun. 8, 2017   (CN) .......................... 2017 1 0427933

(51) Int. Cl.
*G21C 17/01* (2006.01)
*B08B 9/08* (2006.01)
(Continued)

(52) U.S. Cl.
CPC ................ *G21C 17/01* (2013.01); *B08B 5/04* (2013.01); *B08B 9/08* (2013.01); *G21C 17/08* (2013.01);
(Continued)

(58) Field of Classification Search
CPC ....... G21C 17/01; G21C 17/08; G21C 19/207; G21C 19/20; G21C 19/307; B08B 5/04; B08B 9/08; G21D 1/04
(Continued)

(56) References Cited

U.S. PATENT DOCUMENTS

| | | | | |
|---|---|---|---|---|
| 4,374,024 A | * | 2/1983 | Peloquin | B05C 17/00 376/313 |
| 6,352,645 B1 | * | 3/2002 | Wilfong | B01D 29/15 376/313 |

(Continued)

FOREIGN PATENT DOCUMENTS

| | | |
|---|---|---|
| CN | 105361801 A | 3/2016 |
| CN | 106486177 A | 3/2017 |

*Primary Examiner* — Jack W Keith
*Assistant Examiner* — Daniel Wasil

(57) ABSTRACT

A system with function of bending and elongation is used for discharging foreign matters from nuclear reactor vessel. The system includes an operating rod which includes a suction pipe, a bendable rod section connected to the suction pipe, and an expandable rod section connected to the bendable rod section; and a drainage pipe. A suction opening is disposed at the suction pipe and an electric valve is disposed at a connection of the suction opening and the suction pipe. A filter mesh is disposed in the suction pipe; a suction pump is disposed in the suction pipe; a touch switch is disposed on the filter mesh. A water inlet of the suction pump is connected to the suction opening, a water outlet of the suction pump is connected to the outside space of the suction pipe though the drainage pipe, and the electric valve is controlled by the touch switch.

12 Claims, 2 Drawing Sheets

(51) Int. Cl.
*G21C 17/08* (2006.01)
*G21C 19/20* (2006.01)
*B08B 5/04* (2006.01)
*G21C 19/307* (2006.01)

(52) U.S. Cl.
CPC .......... *G21C 19/207* (2013.01); *G21C 19/20* (2013.01); *G21C 19/307* (2013.01)

(58) Field of Classification Search
USPC .......... 376/249, 260, 313; 15/327.1, 327.6; 134/21; 210/416.2
See application file for complete search history.

(56) References Cited

U.S. PATENT DOCUMENTS

| | | | |
|---|---|---|---|
| 7,378,026 B1* | 5/2008 | Thompson | E04H 4/1636 210/416.2 |
| 2011/0132405 A1* | 6/2011 | Lowenstein | B08B 5/04 134/21 |
| 2012/0199161 A1* | 8/2012 | Bijelovic | G21C 17/06 134/10 |

* cited by examiner

SYSTEM FOR REMOVING FOREIGN OBJECTS FROM NUCLEAR REACTOR VESSEL

RELATED APPLICATION(S)

This application claims priority to Chinese patent application No. 201710427933.2 filed on Jun. 8, 2017, the contents of which are hereby incorporated by reference in their entirety.

FIELD OF THE INVENTION

The present invention relates to nuclear apparatus technology, and more particularly to a system with function of bending and elongation for discharging foreign matters from nuclear reactor vessel.

BACKGROUND OF THE INVENTION

Nuclear reactor is an apparatus used for starting, controlling and maintaining the nuclear fission or fusion chain reaction. The reaction rate of the nuclear reactor can be controlled precisely so that the energy of the nuclear reactor is released slowly for the use of people. There are various uses of the nuclear reactor, the most important use is to replace other fuel for producing heat as the steam electric power or the power for running the apparatuses such as aircraft carrier.

Reactor pressure vessel is one of the most important apparatuses in the nuclear reactor, due to equipment aging, vibration, impact, accidental falling of connecting bolts, nuts and tools during maintenance and other reasons, foreign matters are inevitably present at the bottom of the reactor pressure vessel. In the existing art, the foreign matters are taken out of the reactor pressure vessel by manpower, specifically, a diver wearing radiation-proof diving suit was sent into the reactor pressure vessel to take the foreign matters out of the reactor pressure vessel, which is costly and risky.

BRIEF SUMMARY OF THE INVENTION

Therefore, the present invention provides a system with function of bending and elongation for discharging foreign matters from nuclear reactor vessel to solve the problem that foreign matters cannot be safely and easily taken out of the nuclear reactor vessel.

According to an embodiment of the present invention, a system with function of bending and elongation for discharging foreign matters from nuclear reactor vessel comprises an operating rod capable of extending into the nuclear reactor vessel, wherein the operating rod comprises: a suction pipe; a bent rod section connected to an upper end of the suction pipe; an expansion rod section connected to an upper end of the bent rod section; a suction opening disposed at a lower end of the suction pipe; an electric valve disposed at a connection of an upper end of the suction opening and the suction pipe; a filter mesh disposed in the suction pipe and above the electric valve; a suction pump disposed in the suction pipe and above the filter mesh; a touch switch disposed on the filter mesh; and a drainage pipe; wherein a water inlet of the suction pump is connected to the suction opening, a water outlet of the suction pump is connected to the outside space of the suction pipe though the drainage pipe, and the electric valve is controlled by the touch switch.

In another embodiment according to the previous embodiment, the electric valve comprises a valve with mesh structure.

In another embodiment according to the previous embodiment, the system with function of bending and elongation for discharging foreign matters from nuclear reactor vessel further comprises a control switch disposed on an upper end of the expansion rod section.

In another embodiment according to the previous embodiment, the system with function of bending and elongation for discharging foreign matters from nuclear reactor vessel further comprises an operating handle disposed on the upper end of the expansion rod section.

In another embodiment according to the previous embodiment, the drainage pipe comprises an outlet disposed upward, preventing the foreign matters flowing with water.

In another embodiment according to the previous embodiment, the system with function of bending and elongation for discharging foreign matters from nuclear reactor vessel further comprises an alarm disposed on the upper end of the suction pipe, wherein the alarm is connected to and controlled by the touch switch, when the touch switch is triggered and then closed, the alarm will inform the operator to check whether there are foreign matters sucked.

In another embodiment according to the previous embodiment, the expansion rod section is sleeve expansion structure.

In another embodiment according to the previous embodiment, the bent rod section is snake tube structure.

Compared to the existing art, the present invention has advantages and beneficial effects as follows:

1. The present invention provides a system with function of bending and elongation for discharging foreign matters from nuclear reactor vessel, wherein the operating rod with elongating and bending structure is capable of extending into every corner of the nuclear reactor vessel.

2. The filter mesh and the suction pump are sequentially disposed in the suction pipe above the flared pipe, so that the foreign matters in the nuclear reactor vessel can be adsorbed onto the filter mesh by the suction pump, an impact force to the filter mesh is generated when the foreign matters fall onto the filter mesh, and the touch switch disposed on the filter mesh is triggered and then closed under the impact force, closing the electric valve. The system with function of bending and elongation for discharging foreign matters from nuclear reactor vessel in the present invention has a simple structure and is easy to operation, through which foreign matters can be taken out of the reactor vessel even though their specific location is not known.

3. The system with function of bending and elongation for discharging foreign matters from nuclear reactor vessel further comprises an alarm disposed on the top portion of the suction pipe, wherein the alarm is connected to and controlled by the touch switch, when the touch switch is triggered and closed, the alarm will inform the operator to check whether there are foreign matters sucked.

4. According to another aspect of the invention, the valve of the electric valve is of a mesh structure. Thus, when the electric valve is closed, it does not carry water flow and can prevent foreign matters falling off the filter mesh. Furthermore, a mesh-structure valve will not be basically subject to flow resistance when it is closed, and can be instantly closed when foreign matters touch the filter mesh, thus preventing foreign matters leaking outside of the mesh-structure valve. While normal electric valves are always used to completely shut down or control flow rate of fluid, the present invention only takes advantage of their rotation and control structure.

Compared with the existing mechanical grasping structure, the present invention takes a mesh-structure valve to prevent foreign matters from being leaked, thereby facilitating the operation and holding of foreign matters.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawing, in which.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
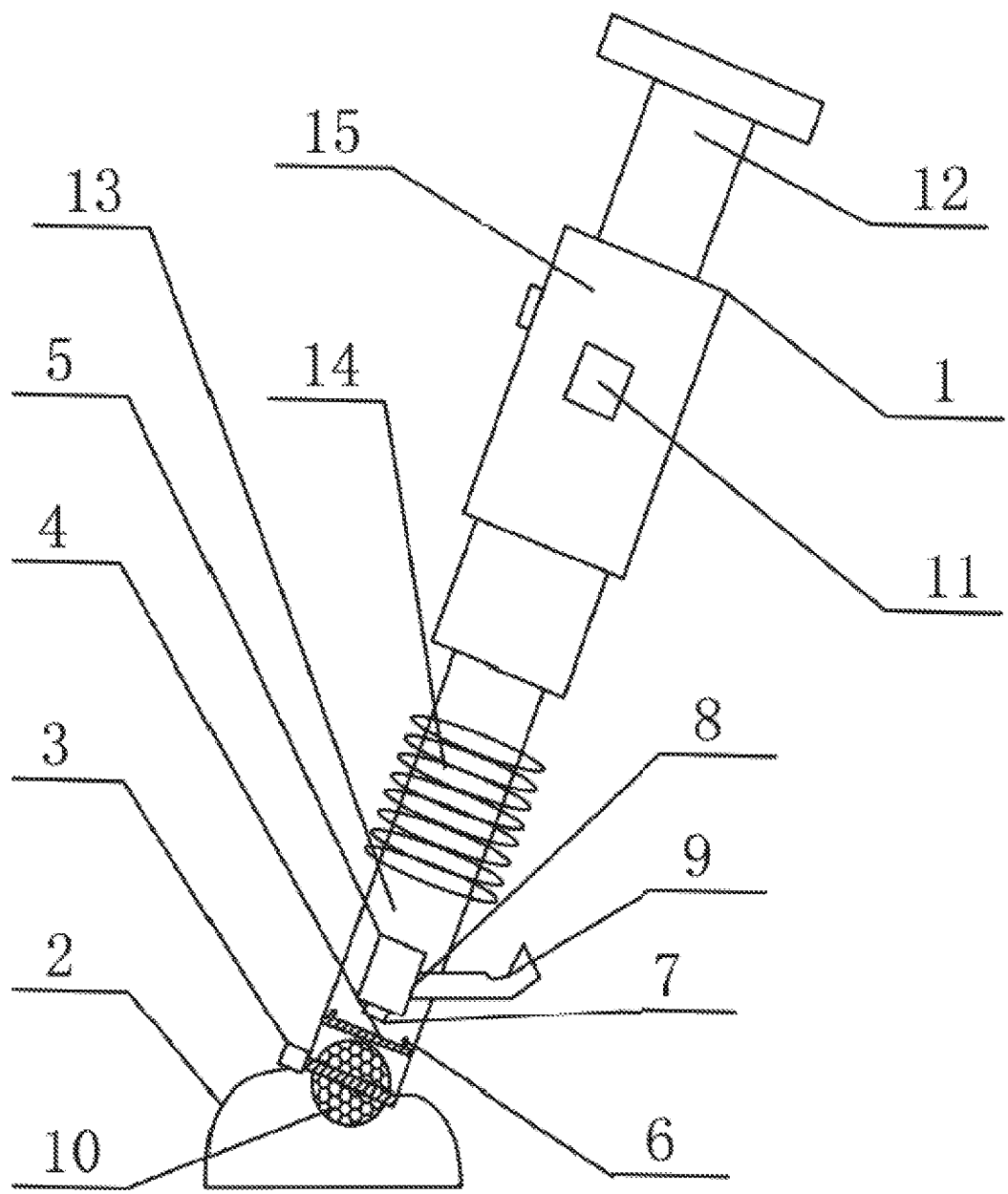
FIG. 1 is a schematic view of the system with function of bending and elongation for discharging foreign matters from nuclear reactor vessel according to an embodiment of the present invention.
Figure 2:
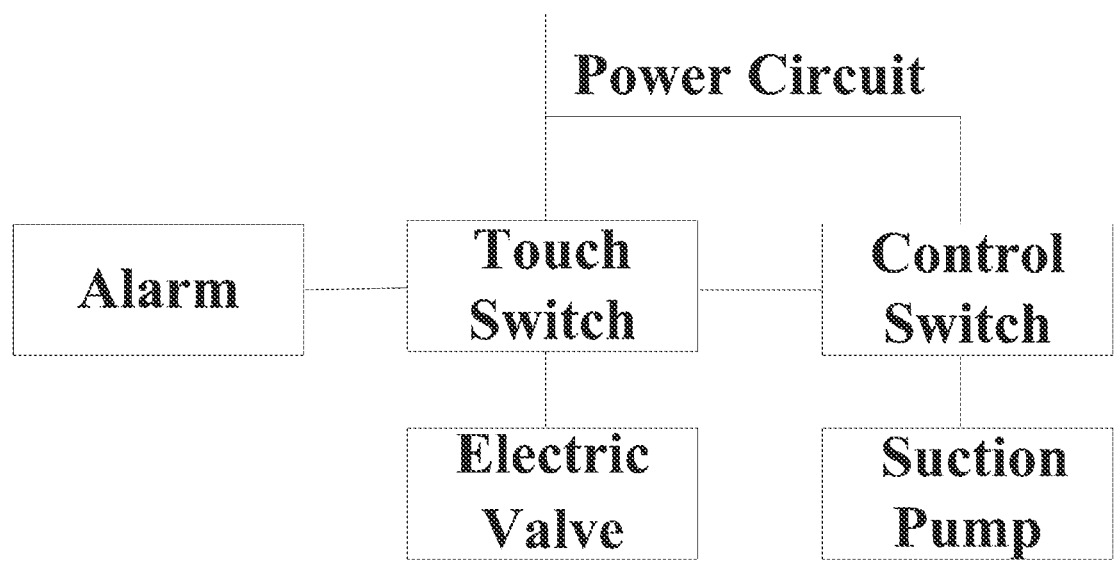
FIG. 2 is a schematic view of the control principle according to an embodiment of the present invention.

As shown in FIG. 1 and FIG. 2, The system with function of bending and elongation for discharging foreign matters from nuclear reactor vessel comprises an operating rod 1 capable of extending into the nuclear reactor vessel, wherein the operating rod comprises: a suction pipe 13; a bent rod section 14 connected to an upper end of the suction pipe; an expansion rod section 15 connected to an upper end of the bent rod section. The expansion rod section 15 is sleeve expansion structure, and the bent rod section 14 is snake tube structure. The operating rod with elongating and bending structure is capable of extending into every corner of the nuclear reactor vessel.

Further, a suction opening 2 disposed at a lower end of the suction pipe 13, which is the equation of a trumpet easing to form a suction pump; an electric valve 3 disposed at a connection of an upper end of the suction opening 2 and the suction pipe 13; a filter mesh 4 disposed in the suction pipe and above the electric valve; a suction pump 5 disposed in the suction pipe and above the filter mesh; a touch switch 6 disposed on the filter mesh; and a drainage pipe 9; wherein a water inlet of the suction pump 7 is connected to the suction opening, a water outlet of the suction pump 8 is connected to the outside space of the suction pipe though the drainage pipe 9. The electric valve 3 comprises a valve 10 with mesh structure.

Further, a control switch 11 disposed on an upper end of the expansion rod section to control the suction pump 5 to be open or closed.

Further, an operating handle 12 disposes on the upper end of the expansion rod section 15, operator is able to send the operating rod into the nuclear reactor vessel and move it by operating the operating handle 12 so as to take out of the foreign matters.

Further, the drainage pipe 9 comprises an outlet disposed upward, preventing the foreign matters flowing with water.

Further, an alarm disposed on the upper end of the suction pipe, wherein the alarm is connected to and controlled by the touch switch, when the touch switch 6 is triggered and then closed, the alarm will inform the operator to check whether there are foreign matters sucked.

According to the present invention, under the suction of the suction pump 5 disposed in the suction pipe 13, foreign matters and cooling water in nuclear reactor vessel are sucked into the suction pipe 13 though the suction opening 2. When the foreign matters and cooling water through the connection of the upper end of the suction opening 2 and the suction pipe, the electric valve is opened. The foreign matters and cooling water which through the electric valve are filtered by the filter mesh 4. The cooling water across the filter mesh, and the touch switch 6 disposed on the filter mesh 4 is triggered and then closed under the impact force generated by foreign matters. Then the electric valve 3 is closed by the touch switch 6 to prevent the foreign matters in the suction pipe between the filter mesh and the valve 10 of the electric valve 3.

Further, the filter mesh 4 and the suction pump 5 are sequentially disposed in the suction pipe 1 above the suction opening structure 2, so that the foreign matters in the nuclear reactor vessel can be adsorbed onto the filter mesh 4 by the suction pump 5, an impact force to the filter mesh 4 is generated when the foreign matters fall onto the filter mesh 4, and the touch switch 6 disposed on the filter mesh 4 is triggered and then closed under the impact force, then the electric valve 3 is closed by the touch switch 6. The system with function of bending and elongation for discharging foreign matters from nuclear reactor vessel in the present invention has a simple structure and is easy for operation, through which foreign matters can be taken out of the reactor vessel even though their specific location is not known.

Further, an alarm disposed on the upper end of the suction pipe, wherein the alarm is connected to and controlled by the touch switch, when the touch switch 6 is triggered and then closed, the alarm will inform the operator to check whether there are foreign matters sucked.

According to another aspect of the invention, the valve of the electric valve 3 is a mesh structure. Thus, when the electric valve 3 is closed, it does not carry water flow and can prevent foreign matters falling off the filter mesh 4. Furthermore, a mesh-structure valve will not be basically subject to flow resistance when it is closed, and can be instantly closed when foreign matters touch the filter mesh 4, thus preventing foreign matters leaking outside of the mesh-structure valve. While normal electric valves are always used to completely shut down or control flow rate of fluid, the present invention only takes advantage of their rotation and control structure. Compared with the existing mechanical grasping structure, the present invention takes a mesh-structure valve to prevent foreign matters from being leaked, thereby facilitating the operation and holding of foreign matters.

For making the above and other purposes, features and benefits become more readily apparent to those ordinarily skilled in the art, the preferred embodiments and the detailed descriptions with accompanying drawings will be put forward in the following descriptions.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A system with function of bending and elongation for discharging foreign matters from nuclear reactor vessel, comprising an operating rod capable of extending into the nuclear reactor vessel, wherein the operating rod comprises:
 a suction pipe;
 a bendable rod section connected to an upper end of the suction pipe;
 an expandable rod section connected to an upper end of the bendable rod section;
 a suction opening disposed at a lower end of the suction pipe;
 an electric valve disposed at a connection of an upper end of the suction opening and the suction pipe;
 a filter mesh disposed in the suction pipe and above the electric valve;
 a suction pump disposed in the suction pipe and above the filter mesh;
 a touch switch disposed on the filter mesh, wherein the touch switch is in operative connection with the electric valve and wherein a foreign matter impact force to the filter mesh triggers the touch switch to close which causes the electric valve to close which prevents escape of foreign matter from the system; and
 a drainage pipe; wherein a water inlet of the suction pump is connected to the suction opening, a water outlet of the suction pump is connected to an outside space of the suction pipe though the drainage pipe, and the electric valve is controlled by the touch switch.

2. The system with function of bending and elongation for discharging foreign matters from nuclear reactor vessel according to claim 1, wherein the electric valve comprises a valve with mesh structure.

3. The system with function of bending and elongation for discharging foreign matters from nuclear reactor vessel according to claim 1, further comprising a control switch disposed on an upper end of the expandable rod section.

4. The system with function of bending and elongation for discharging foreign matters from nuclear reactor vessel according to claim 1, further comprising an operating handle disposed on the upper end of the expandable rod section.

5. The system with function of bending and elongation for discharging foreign matters from nuclear reactor vessel according to claim 1, wherein the drainage pipe comprises an outlet disposed upward, preventing the foreign matters flowing with water.

6. The system with function of bending and elongation for discharging foreign matters from nuclear reactor vessel according to claim 1, further comprising an alarm disposed on the upper end of the suction pipe, wherein the alarm is connected to and controlled by the touch switch, when the touch switch is triggered and then closed, the alarm will inform the operator to check whether there are foreign matters sucked.

7. The system with function of bending and elongation for discharging foreign matters from nuclear reactor vessel according to claim 2, further comprising an alarm disposed on the upper end of the suction pipe, wherein the alarm is connected to and controlled by the touch switch, when the touch switch is triggered and then closed, the alarm will inform the operator to check whether there are foreign matters sucked.

8. The system with function of bending and elongation for discharging foreign matters from nuclear reactor vessel according to claim 3, further comprising an alarm disposed on the upper end of the suction pipe, wherein the alarm is connected to and controlled by the touch switch, when the touch switch is triggered and then closed, the alarm will inform the operator to check whether there are foreign matters sucked.

9. The system with function of bending and elongation for discharging foreign matters from nuclear reactor vessel according to claim 4, further comprising an alarm disposed on the upper end of the suction pipe, wherein the alarm is connected to and controlled by the touch switch, when the touch switch is triggered and then closed, the alarm will inform the operator to check whether there are foreign matters sucked.

10. The system with function of bending and elongation for discharging foreign matters from nuclear reactor vessel according to claim 5, further comprising an alarm disposed on the upper end of the suction pipe, wherein the alarm is connected to and controlled by the touch switch, when the touch switch is triggered and then closed, the alarm will inform the operator to check whether there are foreign matters sucked.

11. The system with function of bending and elongation for discharging foreign matters from nuclear reactor vessel according to claim 6, wherein the expandable rod section is telescopic sleeve structure.

12. The system with function of bending and elongation for discharging foreign matters from nuclear reactor vessel according to claim 7, wherein the bendable rod section is coiled tube structure.

\* \* \* \* \*